May 31, 1932. G. S. EBLE 1,860,497
VALVE
Filed May 7, 1928 2 Sheets-Sheet 1
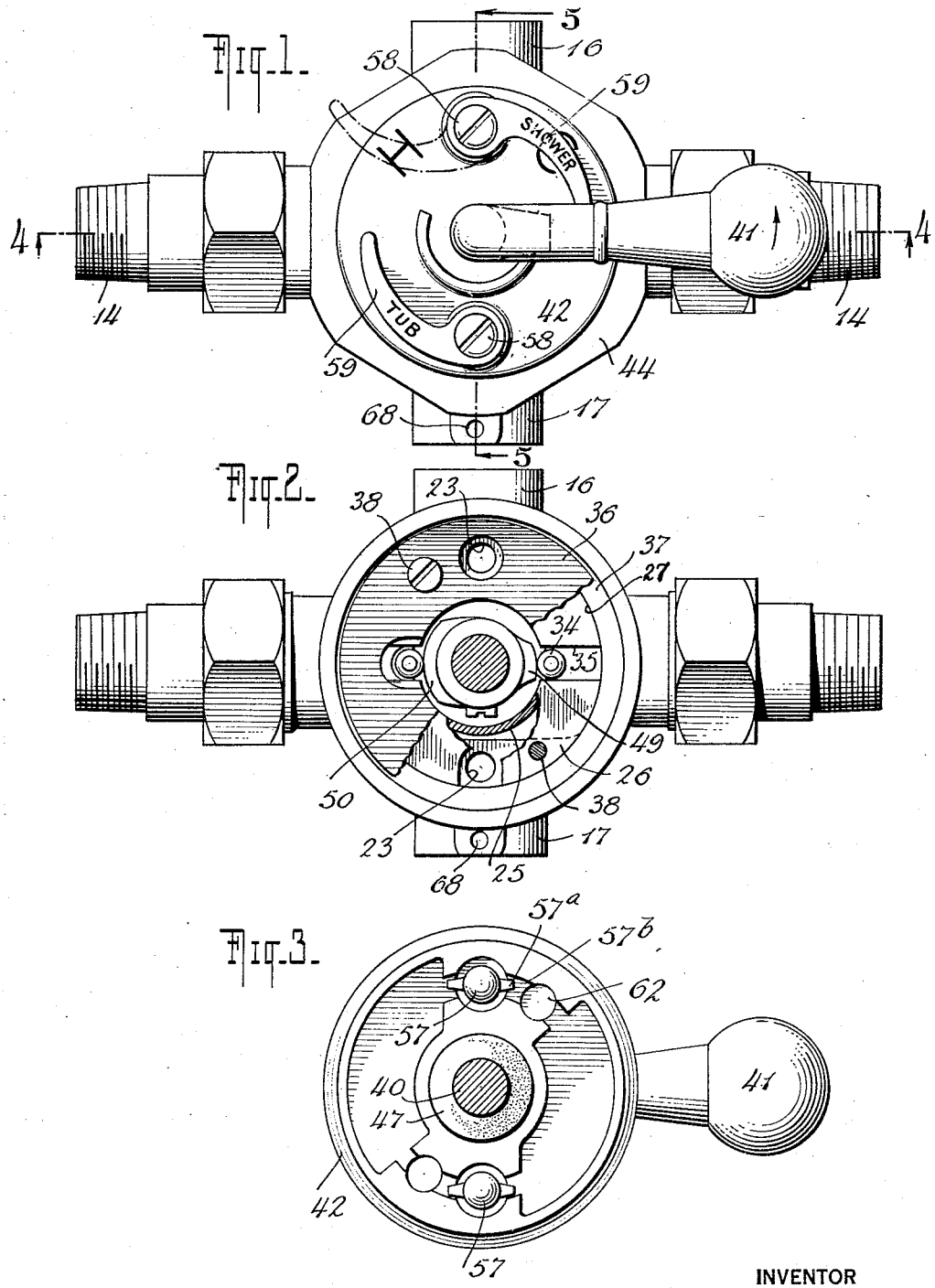
INVENTOR
GROVER S. EBLE
BY
ATTORNEYS

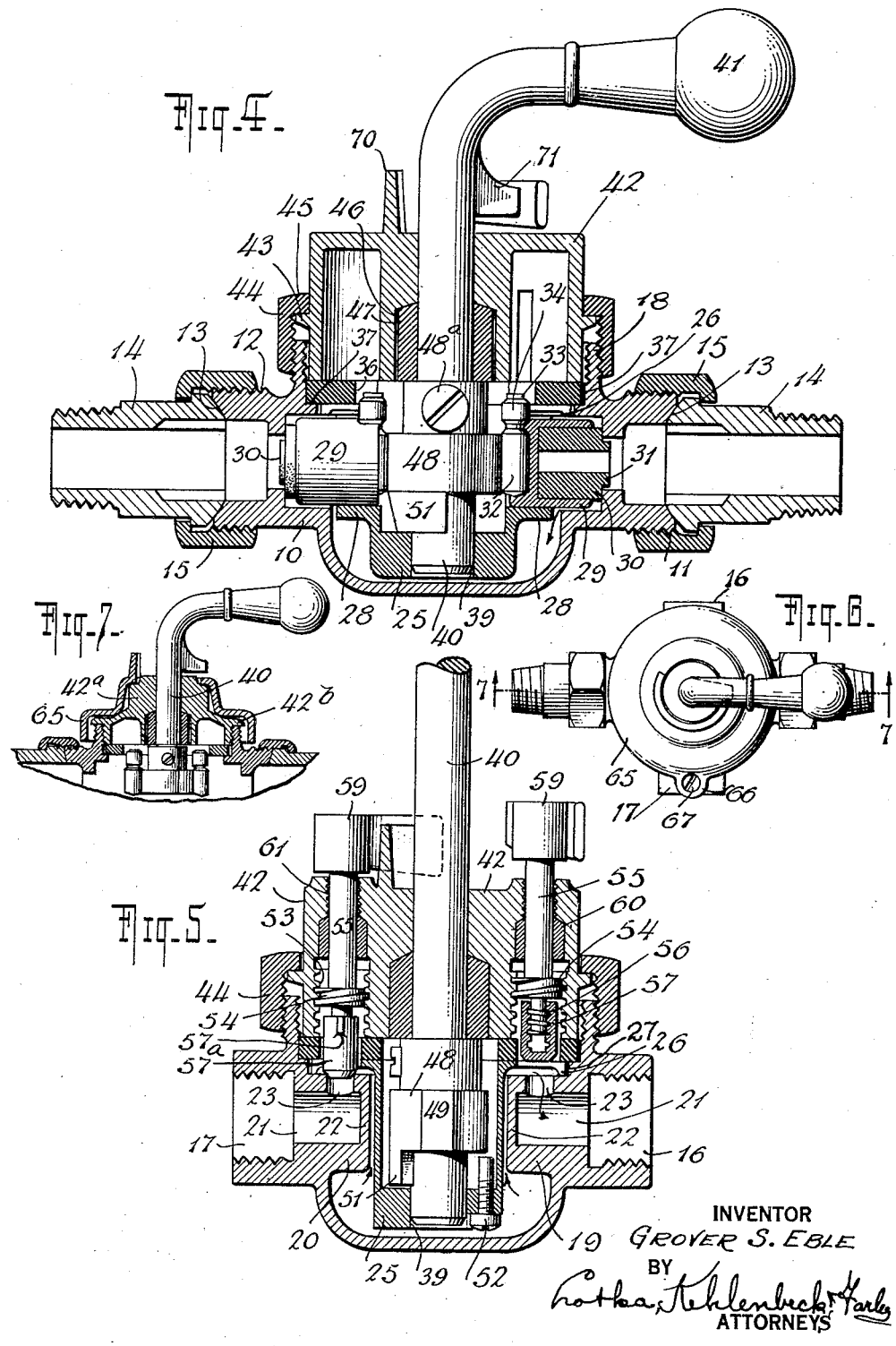

Patented May 31, 1932

1,860,497

UNITED STATES PATENT OFFICE

GROVER S. EBLE, OF WHITESTONE, NEW YORK

VALVE

Application filed May 7, 1928. Serial No. 275,567.

This invention relates to valves and particularly to mixing valves to which hot and cold water are led by separate inlet pipes to become mingled in the valve casing and discharged therefrom through an outlet pipe to the place of use. Mixing valves as heretofore constructed have, as far as I am aware, been limited to the use of a single discharge pipe and also have not been provided with any means for regulating or controlling the volume of water delivered through the discharge outlet. As a result, whenever it was desired to provide a plumbing installation consisting of a bath tub and shower combined, it was necessary to employ separate valves for each part of the installation. If a volume control was desired, an additional valve in a separate housing has always been employed in addition to the mixing valve. The use of such additional valves not only detracts from the appearance of the installation, and necessarily increases the number of pipe joints and therefore the liability of leakage through such joints but also produces an installation more difficult and cumbersome to operate and regulate.

The principal object of this invention is to provide a new and improved construction for a mixing valve, in which means are provided for both temperature and volume control, and in which two or more separate outlets are provided, each having a separate manually operable shut-off.

Another object of the invention is to provide a mixing valve of marked simplicity and therefore low cost of construction, of neat and attractive appearance, and of great strength and durability.

The above and other objects of the invention will appear more fully from the following more detailed description and by reference to the accompanying drawings forming a part hereof, wherein Fig. 1 is a plan view of a mixing valve assembly constructed in accordance with the principles of my invention; Fig. 2 is a similar view of said valve with the bonnet removed, but with the valve shaft in its operative position and shown in section; Fig. 3 is an inverted plan of the valve bonnet, the valve shaft being shown in section; Fig. 4 is a central section taken on the line 4—4 of Fig. 1; Fig. 5 is a section on the line 5—5 of Fig. 1; Fig. 6 is a plan view similar to Fig. 1 but on a reduced scale showing the valve provided with an interchangeable valve cap or bonnet for use with a single outlet only, and Fig. 7 is a section on the line 7—7 of Fig. 6 showing the top part only of the structure shown in Fig. 6.

As shown in the drawings, the valve comprises a main housing 10, (see Fig. 4) having formed integral therewith the threaded inlets 11 and 12. Each of the inlets 11 and 12 has its outer end machined, as indicated at 13, to provide a joint for co-operation with a union nipple 14, the joint 13 being ground in the usual manner, and the union nipple being adapted to be secured in position by means of a nut 15, which engages with the outer threaded portion of the inlet.

Projecting from the sides of the housing 10 and integral therewith, is a pair of outlets 16, 17, said outlets as shown preferably extending at right angles to the inlets 12, 13. The interior of the outlets 16, 17 are screw-threaded for the attachment of pipes or conduits which lead the water to the place of use. The valve housing 10 is also provided with an upwardly extending annular flange 18, which is threaded on both its outer and inner surfaces for a purpose presently to be more fully described. Projecting inwardly into the interior of the housing 10 and in axial alignment with the outlets 16, 17, (see Fig. 5) are a pair of bosses 19, 20, formed integral with the valve housing. Each of the bosses 19, 20 is provided with a bore 21, the inner end of which is closed by a wall 22. The upper side of each of said bosses is provided with an aperture 23, which communicates with the interior of the valve housing, and the opening of which is controlled by a valve plug presently to be described.

Seated within the housing 10 is a valve carrying cage 25, said cage being provided at its upper end with a horizontally extending annular flange 26, which is seated within a counter-bore 27 of the housing 10. The cage 25 is provided, as shown in Fig. 4, with a pair of laterally projecting apertured bosses 28 which form guideways for the valve plug holders 29, the latter being slidably mounted within the apertures of the bosses 28. Each of the holders 29 is bored out on one side to provide a cylindrical recess for a valve plug 30, the latter preferably being constructed of any suitable resilient material, such as rubber, and having the form of a hollow sleeve, the outer end of which is reduced to form a small projecting teat 31, which is adapted to enter into the bore of the respective inlet 11 or 12, which the plug intended to control. Each plug holder 29 is provided on its other side with a small vertically extending semi-cylindrical recess, in which a roller 32 is adapted to be rotatably received. Each roller 32 has its upper end reduced, as at 33, and has rotatably mounted thereon a second small roller 34, which is adapted to engage within a diametrically extending slot 35, provided in the annular flange 26 of the cage 25. Mounted upon the upper face of the cage 25 is a washer 36, the outer edge of which is seated within a second counter-bore 37 of the valve housing 10 and the washer and cage are held in position within the housing by means of screws 38 (see Fig. 2) which pass into suitable threaded lugs (not shown) formed in the inner walls of the valve housing 10.

Rotatably mounted in an aperture 39, formed in the lower wall of the cage 25, is a valve rod or shaft 40, the upper end of which extends at a right angle and terminates in a ball-shaped handle 41. The valve rod 40 passes through a central aperture in a valve bonnet 42, the latter being provided between its ends with a laterally projecting annular flange 43. The bonnet 42 is held in place by means of a bonnet nut 44, rotatably mounted upon said bonnet and having a flange 45 which engages the laterally extending flange 43 of the bonnet. The nut 44 screws upon the exterior thread of the threaded flange 18 of the housing 10 and serves to clamp the bonnet in position upon the housing with the lower face of said bonnet in tight contact engagement with the washer 36. The lower face of the bonnet 42 is counterbored as at 46 to receive a sleeve-like gasket 47 which encircles the valve rod 40. As clearly shown in Fig. 4, the gasket 47 is of slightly smaller diameter than the counterbore 46 for a purpose hereinafter to be more fully set forth.

Secured to the valve rod 40 is a cam 48, having a pair of diametrically opposite cam throws 49, 50, (see Fig. 2), which are adapted to engage with the rollers 32 of the valve plug holders 29 when the handle 41 is thrown to the position shown in the drawings, thereby moving the valve plug holders with the valve plugs 30 mounted therein outwardly of the cage 25, and forcing the ends of the plugs 30 into tight contacting engagement with the valve seats provided at the inner end of the inlets 11 and 12. The cam 48 is also provided with a downwardly extending lug 51, the side edges of which are adapted to engage with a stop screw 52 (see Fig. 5) for limiting the throw of the valve rod 40 and handle 41.

Mounted within a pair of screw-threaded bores 53 (see Fig. 5) of the valve bonnet 42 are the lower enlarged screw-threaded ends 54 of the volume control valve rods 55. Each of said valve rods has its lower end reduced and threaded as at 56. Mounted upon the threaded lower end of each valve rod 55 is a valve plug 57, the lower end of which is chamfered and adapted to engage with the upper edge of the aperture 23, provided in the boss 19 of the valve housing 10. In order to secure a full opening of the valve plugs 57 with a relatively small movement of the rods 55, the threads upon the reduced portion 56 of said rods are of opposite pitch to the threads upon the enlarged portions 54 and each valve plug is provided with a pair of laterally projecting wings 57ª which engage between the walls of an arcuate slot 57ᵇ (see Fig. 3) for preventing rotation of the valve plug when the valve rod 55 is rotated, whereby there will be secured a differential movement of the valve plugs for a given amount of rotation of the rods 55. The valve rods 55 extend through suitable apertures provided in the upper wall of said bonnet 42, and secured to the outer end of each rod, as by means of the screw 58, is an arc-shaped valve control lever 59. A suitable packing is provided for each valve rod 55, which packing preferably consists of a hollow sleeve 60, seated within a counterbore provided in the interior of the valve bonnet.

In order that one of the valve rods 55 and parts associated therewith may be dispensed with if it is desired to use the valve for supplying a single fixture only, the apertures in the top of the bonnet 42 through which the valve rods 55 pass, are interiorly threaded, as indicated by the reference character 61, to enable a stop plug to be inserted therein to close such aperture. The valve bonnet 42 has drilled therein a pair of diametrically opposite holes or recesses 62 which are adapted to engage over the heads of the screws 38, the engagement of said holes with the heads of said screws serving to position properly the bonnet upon the housing, the heads of such screws functioning as dowel pins.

The operation of the valve is as follows: With the handle 41 in the position shown in the drawings, both of the intakes 11 and 12 are fully closed by the valve plugs 30. Movement of the handle in the direction of the arrow in Fig. 1 will cause the cam throw 49, which, it will be noted, is shorter in length than the cam throw 50, to move out of contact with the roller 32 shown at the right hand side of Fig. 4. The pressure of the water against the valve plug will cause the roller to be held against the periphery of the cam and thereby, as the throw 49 moves out of contact with the roller 32, the valve plug will move to its opened position, thus permitting the water to flow into the interior of the valve housing from the intake 11 to which the cold water supply is connected. The length of the cam throws 49, 50 are so proportioned that the throw 50 will remain in engagement with the roller 32, shown at the left hand side of Fig. 4, to hold the valve plug 30 at said side in closed position after the plug 30 at the right hand side has been opened. Consequently cold water only will be admitted into the valve housing until the handle 41 has been moved sufficiently in the direction indicated by the arrow to bring the cam throw 50 out of contact with its respective roller 32. A further movement of the handle will permit the valve plug 30 at the left hand side to open under the pressure of the water, thus permitting the hot water to enter through the intake 12 and mingle with the cold water admitted through the intake 11. The full opening of both valves is secured when the handle 41 is substantially in a vertical position, that is to say, a position approximately 90° from the position shown in the drawings. Further movement of the handle 41 will bring the forward end of the cam throw 50 in engagement with the roller 32 at the right hand side of the drawings, thereby to close the cold water supply while leaving the hot water supply open. The forward end of the cam throw 50 is so cut that a gradual closing of the cold water supply valve may be secured, thus enabling the mixture of hot and cold water to be determined as desired by changes in the position of the handle 41.

If the valve is included as a part of an installation which includes two fixtures to be supplied with water as, for example, a bath tub and a shower, the supply of water may be directed to either one of the fixtures, while the other is shut off, or to both of them if so desired, by manipulating the control valve levers 59. The levers 59 are shown in Fig. 1 of the drawings in the closed position. Assuming for example that it is desired to direct the supply of water through the outlet 16 shown at the upper end of Fig. 1, which, it may be assumed has connected thereto, a shower fixture, the lever 59 is thrown from the full line position to the dotted line position shown in Fig. 1, thereby causing the valve rod 55 to be rotated, and the differential screw thread arrangement causing the valve plug 57 to be moved to its full opened position. If it is desired to direct the water through the outlet 17 shown at the bottom of Fig. 1, the lever 59 shown in the lower part of said figure will be thrown in a similar manner to open the other valve plug 57. If it is desired to throttle the supply of water delivered through either of the openings 16 or 17, the handles 59 can be set to a position intermediate the full line and the dotted line positions, thereby shutting off the valve to any desired extent, according to the position of the lever. As will be seen from the foregoing and from an inspection of the drawings, each of the valve levers 59 is entirely independent of the other, so that either valve plug 57 may be entirely closed, while the other valve plug 57 is open.

The small rollers 34 which are associated with the rollers 32 co-operate with the slots 35 provided in the annular flange of the cage 25 to keep the axis of the rollers 32 parallel with the axis of the valve rod 40 thereby to maintain the rollers 32 in proper position relative to the cam 48.

It will be noted that the valve is so designed that all of the moving parts which are subjected to any wear in the operation of the valve are readily removable for replacement or repairs without disturbing any of the pipe fitting connections or joints of the valve housing. For example, the mixing valve rod 40 is journaled in two removable members, namely, the bonnet 42 and the cage 25; the flow control valves 57 and the parts connected therewith are also mounted in the bonnet 42 and are removable with the bonnet so that the operation of renewing one of the valve plugs 57 is a very simple one; the valve plug holders 29 are slidably mounted in the guideways forming in the laterally projecting bosses of the cage 25 and the bores provided in the housing 10 into which the valve plug holders 29 pass are larger in diameter than the plug holders, so that there is no contact between the plug holders and the valve housing. The operation of renewing the valve plugs 30 is a very simple one, as all that is required is to unscrew the valve bonnet nut 44 and remove the bonnet and valve rod 40. The valve plug holder can then be removed by pressing against the roller 34 and sliding the valve plug holder 29 with the valve plug 30 contained therein towards the center of the valve housing until the holder is moved clear of the guideway formed in the boss 28, after which the valve plug assembly, comprising the rollers 32, the valve plug and the valve plug holder, can be removed out through the open top of the valve. If, after extended use, the cam 48 should become badly worn, it may be removed and a new cam substituted, by loosening the screw 48ª which holds the cam in position upon the mixing valve rod 40.

As it may be desired to use the mixing valve in many installations where a shower only or a tub only is provided, I have, for the purpose of standardizing the manufacture, so constructed the valve that it may be used as a part of a double installation, with a pair of controls, one for each fixture, as a unitary assembly having a mixing valve and a single flow control, or as a unitary assembly having a mixing valve with the flow control eliminated. In the latter case, the valve bonnet 42 and bonnet nut 45 are not employed, but I substitute therefor a plain bonnet 42ª having a threaded flange at its lower end for engagement with the interior threads of the flange 18 of the valve housing 10. The bonnet 42ª is provided with a laterally extending flange 42ᵇ which extends over and covers the outer end of the flange 18.

In order to protect the exterior threads of the flange 18 and to give a neat finished appearance to the valve when used as a plain mixing valve, a bonnet cover cap 65 is provided, which fits over the bonnet 42ª. The cover cap 65 is furnished with a small projecting tab or ear 66 apertured to permit the passage of a fillister screw 67, the ear being counterbored to receive the screw head. The threads of the fillister screw are engaged with a screw-threaded hole 68 provided in the outlet 17.

As a safeguard against the shearing off of the stop pin 52 in case excessive pressure should be exerted upon the valve operating handle 41, the bonnet 42 is preferably provided with an upwardly projecting flange or rib 70 located adjacent to the valve rod 40. The latter is provided with a laterally projecting lug 71 adapted to co-operate with the ends of the rib 70 to check the rotation of the valve rod and handle when the latter is swung to its extreme open or closed position.

It will be understood that the constructional details of the specific embodiment selected for exemplifying the principles of the invention are merely illustrative and that many changes, variations and modifications of such details may be resorted to without departing from such principles.

I claim:

1. In a mixing valve assembly, a valve housing provided with a pair of inlets and an outlet, a pair of valve plugs, one for each inlet, a single manually operable handle carried by said housing, cam means connected with said handle whereby said valve plugs are both adjusted to their closed positions in the inoperative condition of said mixing valve, and whereby one of said valve plugs is adjusted to its fully open position before the opening movement of the other valve plug begins, and means independent of said handle mounted within said housing for controlling the volume of flow through said outlet.

2. In a mixing valve assembly, a valve housing provided with a pair of inlets and an outlet, a pair of valve plugs, one for each inlet, a single manually operable handle carried by said housing, cam means connected with said handle whereby said valve plugs are both adjusted to their closed positions in the inoperative condition of said mixing valve, and whereby one of said valve plugs is adjusted to its fully open position before the opening movement of the other valve plug begins and moves toward its closed position as the opening movement of said other valve continues, and means independent of said handle mounted within said housing for controlling the volume of flow through said outlet.

3. In a mixing valve assembly, a valve housing provided with a pair of inlets and a pair of outlets, a pair of valve plugs, one for each inlet, a single manually operable handle carried by said housing, cam means within said housing connected with said handle whereby said valve plugs are both adjusted to their closed positions in the inoperative condition of said mixing valve, and whereby one of said valve plugs is adjusted to its fully open position before the opening of the other valve plug begins and moves toward its closed position as the opening of said valve continues, and means independent of said handle mounted within said housing for controlling the flow through each of said outlets and for independently and separately directing said flow through one or the other of said outlets.

4. In a mixing valve assembly, a housing provided with a pair of inlets and a pair of outlets, a single manually operable handle and cam means connected therewith for controlling the flow through said inlets and a pair of separate manually operable controls mounted within said housing for independently controlling the flow through said outlets.

5. In a mixing valve assembly, a housing provided with a pair of inlets and an outlet, a main valve rod and handle, a pair of valves, one for each of said inlets, cam means connected with said valve rod and operated by the actuation of said handle whereby said valves are both adjusted to their closed positions in the inoperative condition of said mixing valve and whereby one of said valves is adjusted to its fully open position before the opening movement of the other valve begins, and a separate valve and control therefor mounted within said housing for controlling the volume of flow through said outlet.

6. In a mixing valve assembly, a housing provided with a pair of inlets and a pair of outlets, a pair of valves, one for each of said inlets, a single manually operable control and cam means actuated thereby for said pair of valves, a second pair of valves, mounted within said housing, one for each of said outlets and a pair of independently operable manual controls, one for each of said second valves.

7. In a mixing valve assembly, a housing having a pair of inlets, a valve bonnet secured to said housing, a bearing cage enclosed in said housing, said cage having a pair of apertured bosses in axial alignment with said inlets, a pair of valve carrying members slidably mounted in said bosses, resilient valve plugs carried by said members and a valve rod having a cam secured thereto located between said members for selectively actuating them.

8. A valve assembly as set forth in claim 7 in which anti-friction rollers are interposed between said cam and members, said bearing cage is provided with a pair of guideways and means are provided for maintaining the axes of said rollers in parallelism with the axis of the valve rod, said means comprising a second pair of rollers carried by said first named rollers and engaging with said guideways.

9. In a valve assembly, a valve casing and a bonnet detachably secured thereto, a valve rod carried by said bonnet, said bonnet having a cylindrical recess in its inner face surrounding said valve rod and a packing consisting of a relatively long hollow sleeve of resilient material encasing a portion of said rod and seated within said recess, the diameter of the periphery of said sleeve being less than the diameter of said recess whereby a clearance space between said sleeve and recess is formed to permit the pressure of the fluid passing through said casing to be exerted on the exterior of said sleeve to cause the latter to be tightly compressed upon said valve rod and thereby prevent leakage about said rod of fluid from said casing.

10. In a valve assembly, a valve casing provided with a pair of inlets and a pair of outlets each member of which has a valve seat, a valve for engagement with each valve seat, a valve bonnet detachably secured to said casing and a plurality of manually operable members operatively combined with said bonnet to allow selective opening or closing of any of said valves.

11. In a mixing valve a unitary assembly, comprising a valve casing having a pair of inlets and a pair of outlets, a main manually operable control handle and valve rod and a pair of valves, one for each inlet, actuated thereby for selectively controlling the flow through said inlets, a pair of valves, mounted within said casing, one for each outlet, for controlling the flow through said outlets, a separate valve rod and manually operable handle for each of said last named valves, and differential screw means interposed between said last named valves and their respective operating handles.

12. In a valve assembly, a valve casing having a plurality of inlet and outlet conduits, a bearing cage and means for securing it within said casing, a bonnet detachably secured to said casing, valves for certain of said conduits carried by said bonnet and said bonnet being provided with means for co-operation with said securing means for locating said bonnet in proper position upon said casing with the valves carried by said bonnet in correct alignment with their respective conduits.

In testimony whereof I have hereunto set my hand.

GROVER S. EBLE.